United States Patent
Dong

(10) Patent No.: US 9,544,928 B2
(45) Date of Patent: Jan. 10, 2017

(54) FAST INITIAL LINK SETUP COMMUNICATION DEVICE AND METHOD

(75) Inventor: Xiandong Dong, Shenzhen (CN)

(73) Assignee: Yulong Computer Telecommunication Scientific (Shenzhen) Co., Ltd., Shenzhen (CN)

(*) Notice: Subject to any disclaimer, the term of this patent is extended or adjusted under 35 U.S.C. 154(b) by 98 days.

(21) Appl. No.: 14/366,204

(22) PCT Filed: Jun. 8, 2012

(86) PCT No.: PCT/CN2012/076676
§ 371 (c)(1),
(2), (4) Date: Jun. 17, 2014

(87) PCT Pub. No.: WO2013/181852
PCT Pub. Date: Dec. 12, 2013

(65) Prior Publication Data
US 2014/0362842 A1  Dec. 11, 2014

(51) Int. Cl.
*H04W 4/00* (2009.01)
*H04W 76/02* (2009.01)
(Continued)

(52) U.S. Cl.
CPC .......... *H04W 76/021* (2013.01); *H04W 48/12* (2013.01); *H04W 48/16* (2013.01); *H04W 8/24* (2013.01); *H04W 84/12* (2013.01)

(58) Field of Classification Search
None
See application file for complete search history.

(56) References Cited

U.S. PATENT DOCUMENTS

| 2013/0247150 A1* | 9/2013 | Cherian | ................ | H04W 12/06 726/4 |
| 2013/0263223 A1* | 10/2013 | Cherian | ................ | H04L 9/0869 726/4 |

(Continued)

FOREIGN PATENT DOCUMENTS

| CN | 1581823 A | 2/2005 |
| CN | 1604548 A | 4/2005 |

OTHER PUBLICATIONS

LG Electronics, "FILS Association", IEEE 802. 11-11/1169r1, Jan. 17, 2012, p. 6-10.

*Primary Examiner* — Otis L Thompson, Jr.
(74) *Attorney, Agent, or Firm* — Bret E. Field; Rudy J. Ng; Bozicevic, Field & Francis LLP

(57) ABSTRACT

The present invention provides Fast Initial Link Setup communication device and method, wherein, the device comprises: a service processing module which generates a Beacon frame which physical frame header comprises a first identification information field and/or a physical layer convergence procedure service data unit comprises a second identification information field, and the value of the first identification information field is a first value and/or the value of the second identification information field is a second value, which shows that a Fast Initial Link Setup function is supported, and sends the Beacon frame; and/or receives an initial link setup first message; and a wireless transceiver module. The present invention solves the compatibility problem that an STA that does not support the FILS function enters a WLAN network which supports the FILS function and an STA that supports the FILS function enters a WLAN that does not support the FILS function.

24 Claims, 9 Drawing Sheets

(51) Int. Cl.
*H04W 48/12* (2009.01)
*H04W 48/16* (2009.01)
H04W 8/24 (2009.01)
H04W 84/12 (2009.01)

(56) References Cited

U.S. PATENT DOCUMENTS

| | | | | |
|---|---|---|---|---|
| 2013/0283346 A1* | 10/2013 | Sun | ...................... | H04W 12/06 |
| | | | | 726/3 |
| 2013/0294354 A1* | 11/2013 | Zhang | ................... | H04W 72/04 |
| | | | | 370/329 |
| 2015/0245282 A1* | 8/2015 | Kim | ...................... | H04W 48/16 |
| | | | | 370/338 |

* cited by examiner

FILS (Fast Initial Link Setup)

FAST INITIAL LINK SETUP COMMUNICATION DEVICE AND METHOD

FIELD OF THE INVENTION

The present invention involves the technical field of communication, and specifically, to a Fast Initial Link Setup communication device and a Fast Initial Link Setup communication method.

BACKGROUND OF THE INVENTION

A new project group 11ai is established in the IEEE (Institute of Electrical and Electronics Engineers) 802.11, and the main object of this project group is to achieve simultaneous setup of fast initial link between many STAs (station, terminal/station point) and an AP (Access Point) in a wireless local area network when the STAs enter the coverage area of the AP, and the need of the putting forward the project group is to set up initial link between 100 STAs and the AP in one second.

A current process of initial link between the STA and the AP totally comprises about 13 steps, as specifically shown in FIG. 1. The current initial link setup manner cannot meet the needs of the 11ai, thus should be changed. Being different from a current AP, an AP supporting an FILS (Fast Initial Link Setup) function can set up initial link with an STA supporting the FILS function in a new faster mode.

In this way, a problem will be rendered that, if an STA which does not support the FILS function enters a WLAN (Wireless Local Area Network) network supporting the FILS function, if the process of setting up the initial link follows the FILS function mode, the STA which does not support the FILS function cannot analyze a network access instruction issued by the AP in the WLAN supporting the FILS function, and vice versa, an STA supporting the FILS function cannot set up fast initial link with an AP that does not support the FILS function in the FILS manner.

Therefore, a new technical solution is desired to solve the network incompatibility problem that an STA cannot be connected with an AP in the WLAN when an STA that does not support the FILS function enters a WLAN network which supports the FILS function and an STA that supports the FILS function enters a WLAN that does not support the FILS function.

SUMMARY OF THE INVENTION

The technical problem to be solved by the present invention is to provide a new technical solution to solve the network incompatibility problem, and then STAs can set up initial link with an AP when an STA that does not support the FILS function enters a WLAN network which supports the FILS function and an STA that supports the FILS function enters a WLAN that does not support the FILS function.

Whereas, the present invention provides a Fast Initial Link Setup communication device, comprising: a service processing module which generates a Beacon frame which physical frame header comprises a first identification information field, and/or a physical layer convergence procedure service data unit comprises a second identification information field, and the value of the first identification information field is a first value and/or the value of the second identification information field is a second value, which indicates that the service processing module supports a Fast Initial Link Setup function, and sends the Beacon frame through a wireless transceiver module; and/or receives an initial link setup first message through the wireless transceiver module, and the value of the first identification information field in the physical frame header of the initial link setup first message is the first value and/or the value of the second identification information field in the physical layer convergence procedure service data unit is the second value, which indicates that a terminal supports the Fast Initial Link Setup function; and the wireless transceiver module which interacts data frame with the said communication devices which support the said Fast Initial Link Setup function. In this technical solution, the Fast Initial Link Setup communication device can be devices such as a router, a mobile phone, a tablet computer, and notebook computer, and can serve as an AP, the service processing module is equivalent to a chip processing the services of the wireless local area network, the wireless transceiver module is equivalent to an antenna which transceives the signals of the WLAN, and the AP can use the Beacon frame to inform in advance whether the STA supports the FILS function and can also judge whether the STA supports the FILS function according to the initial link setup first message of the STA, which makes it convenient to set up mutual initial link between the AP and the STA in a proper manner.

In the above technical solution, preferably, the PSDU (PLCP service data unit) comprises an MPDU (MAC protocol data unit) which is an MAC (Media Access Control) frame which comprises a media access control frame header and a media access control frame body. In this technical solution, as long as the initial link setup first message comprises the PSDU, the frame body portion of the MPDU in the PSDU can be used to identify the FILS function.

In the above technical solution, preferably, the first identification information field comprises one or more bits of the signal domains of the Beacon frame and/or the physical frame header of the initial link setup first message; and the second identification information field comprises one or more bits of the Beacon frame and/or the media access control frame of the initial link setup first message. In this technical solution, by way of using the SIG (signal) domains in the Beacon frame or the physical frame header in the initial link setup first message and the MAC frame in the PSDU, informing and discovering the FILS function can be achieved quickly for the STA and the AP.

In the above technical solution, preferably, the second identification information field comprises one or more bits in the ability information domain of the Beacon frame and/or the media access control frame body of the initial link setup first message. In this technical solution, the ability information domain that can be provided with the identification information field is specifically shown, and one skilled in the art should understand that other bits can be selected as the identification information field based on the format changes of the Beacon frame or the initial link setup first message.

In the above technical solution, preferably, the initial link setup first message comprises a probe request frame and/or an association request frame. In this technical solution, the probe request frame and the association request frame also having the PSDU form structure, or the combination of the two are clearly shown, and one skilled in the art should understand that more messages with similar structures can serve as the initial link setup first message.

In the above technical solution, preferably, the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the service processing module and/or the terminal support a traditional initial link setup function. In this technical solution, the identification information field can be used to clearly indicate whether the AP and the STA support the initial link setup function of the traditional manner, and the traditional manner herein is equivalent to the steps in FIG. 1.

In the above technical solution, preferably, when the service processing module and the terminal both support the Fast Initial Link Setup function, the service processing module and the terminal set up initial link in a prescribed manner of the Fast Initial Link Setup; and/or when the service processing module and the terminal do not support the Fast Initial Link Setup function, the service processing module and the terminal set up initial link in a traditional initial link setup manner; and/or when the service processing module supports while the terminal does not support the Fast Initial Link Setup function, the service processing module and the terminal set up initial link in the traditional initial link setup manner; and/or when the service processing module does not support while the terminal supports the Fast Initial Link Setup function, the service processing module and the terminal set up initial link in the traditional initial link setup manner. In this technical solution, it can be ensured that the AP selects a proper manner to set up the initial link with the STA in combination with its supporting situation to the FILS function upon learning whether the STA supports the FILS function, and the traditional manner herein is equivalent to the steps in FIG. 1.

The present invention also provides a Fast Initial Link Setup communication method, comprising: generating a Beacon frame which physical frame header comprises a first identification information field, and/or a physical layer convergence procedure service data unit comprises a second identification information field, and the value of the first identification information field is a first value and/or the value of the second identification information field is a second value, which indicates that an access point supports a Fast Initial Link Setup function; sending the Beacon frame; and/or receiving an initial link setup first message, and the value of the first identification information field in the physical frame header of the initial link setup first message is the first value and/or the value of the second identification information field in the physical layer convergence procedure service data unit is the second value, which indicates that a terminal supports the Fast Initial Link Setup function. In this technical solution, the AP can use the Beacon frame to inform in advance whether the STA supports the FILS function and can also judge whether the STA supports the FILS function according to the initial link setup first message of the STA, which makes it convenient to set up mutual initial link between the AP and the STA in a proper manner.

In the above technical solution, preferably, the PSDU (PLCP service data unit) comprises an MPDU (MAC protocol data unit) which is an MAC (Media Access Control) frame which comprises a media access control frame header and a media access control frame body. In this technical solution, as long as the initial link setup first message comprises the PSDU, the frame body portion of the MPDU in the PSDU can be used to identify the FILS function.

In the above technical solution, preferably, the first identification information field comprises one or more bits of the signal domains of the Beacon frame and/or the physical frame header of the initial link setup first message; and the second identification information field comprises one or more bits of the Beacon frame and/or the media access control frame of the initial link setup first message. In this technical solution, by way of using the SIG (signal) domains in the Beacon frame or the physical frame header in the initial link setup first message and the MAC frame in the PSDU, informing and discovering the FILS function can be achieved quickly for the STA and the AP.

In the above technical solution, preferably, the second identification information field comprises one or more bits in the ability information domain of the Beacon frame and/or the media access control frame body of the initial link setup first message. In this technical solution, the ability information domain that can be provided with the identification information field is specifically shown, and one skilled in the art should understand that other bits can be selected as the identification information field based on the format changes of the Beacon frame or the initial link setup first message.

In the above technical solution, preferably, the initial link setup first message comprises a probe request frame and/or an association request frame. In this technical solution, the probe request frame and the association request frame also having the PSDU form structure, or the combination of the two are clearly shown, and one skilled in the art should understand that more messages with similar structures can serve as the initial link setup first message.

In the above technical solution, preferably, the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the access point and/or the terminal support a traditional initial link setup function. In this technical solution, the identification information field can be used to clearly indicate whether the AP and the STA support the initial link setup function of the traditional manner, and the traditional manner herein is equivalent to the steps in FIG. 1.

In the above technical solution, preferably, it further comprises: when the access point and the terminal both support the Fast Initial Link Setup function, the access point and the terminal set up initial link in a prescribed manner of the Fast Initial Link Setup; and/or when the access point and the terminal do not support the Fast Initial Link Setup function, the access point and the terminal set up initial link in a traditional initial link setup manner; and/or when the access point supports while the terminal does not support the Fast Initial Link Setup function, the access point and the terminal set up initial link in the traditional initial link setup manner; and/or when the access point does not support while the terminal supports the Fast Initial Link Setup function, the access point and the terminal set up initial link in the traditional initial link setup manner. In this technical solution, it can be ensured that the AP selects a proper manner to set up the initial link with the STA in combination with its supporting situation to the FILS function upon learning whether the STA supports the FILS function, and the traditional manner herein is equivalent to the steps in FIG. 1.

The present invention further provides a Fast Initial Link Setup communication device, comprising: a service processing module which generates an initial link setup first message which physical frame header comprises a first identification information field, and/or a physical layer convergence procedure service data unit comprises a second identification information field, and the value of the first identification information field is a first value and/or the value of the second identification information field is a second value, which indicates that the service processing module supports a Fast Initial Link Setup function, and sends the initial link setup first message through a wireless transceiver module; and/or receives a Beacon frame through the wireless transceiver module, and the value of the first identification information field in the physical frame header of the Beacon frame is the first value and/or the value of the second identification information field in the physical layer convergence procedure service data unit is the second value, which indicates that an access point supports the Fast Initial Link Setup function; and the wireless transceiver module which interacts data frame with the said communication devices which support the said Fast Initial Link Setup function. In this technical solution, the Fast Initial Link Setup communication device can be devices such as a mobile phone, a tablet computer, and notebook computer, and can serve as an STA, the service processing module is equivalent to a chip processing the services of the wireless local area network, the wireless transceiver module is equivalent to an antenna which transceives the signals of the WLAN, and the STA can use the initial link setup first message to inform in advance whether the AP supports the FILS function and can also judge whether the AP supports the FILS function according to the Beacon frame of the AP, which makes it convenient to set up mutual initial link between the AP and the STA in a proper manner.

In the above technical solution, preferably, the PSDU (PLCP service data unit) comprises an MPDU (MAC protocol data unit) which is an MAC (Media Access Control) frame which comprises a media access control frame header and a media access control frame body. In this technical solution, as long as the initial link setup first message comprises the PSDU, the frame body portion of the MPDU in the PSDU can be used to identify the FILS function.

In the above technical solution, preferably, the first identification information field comprises one or more bits of the signal domains of the Beacon frame and/or the physical frame header of the initial link setup first message; and the second identification information field comprises one or more bits of the Beacon frame and/or the media access control frame of the initial link setup first message. In this technical solution, by way of using the SIG domains in the physical frame header in the initial link setup first message or the Beacon frame and the MAC frame in the PSDU, informing and discovering the FILS function can be achieved quickly for the STA and the AP.

In the above technical solution, preferably, the second identification information field comprises one or more bits in the ability information domain of the Beacon frame and/or the media access control frame body of the initial link setup first message. In this technical solution, the ability information domain that can be provided with the identification information field is specifically shown, and one skilled in the art should understand that other bits can be selected as the identification information field based on the format changes of the Beacon frame or the initial link setup first message.

In the above technical solution, preferably, the initial link setup first message comprises a probe request frame and/or an association request frame. In this technical solution, the probe request frame and the association request frame also having the PSDU form structure, or the combination of the two are clearly shown, and one skilled in the art should understand that more messages with similar structures can serve as the initial link setup first message.

In the above technical solution, preferably, the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the service processing module and/or the access point support a traditional initial link setup function. In this technical solution, the identification information field can be used to clearly indicate whether the AP and the STA support the initial link setup function of the traditional manner, and the traditional manner herein is equivalent to the steps in FIG. 1.

In the above technical solution, preferably, when the service processing module and the access point both support the Fast Initial Link Setup function, the service processing module and the access point set up initial link in a prescribed manner of the Fast Initial Link Setup; and/or when the service processing module and the access point do not support the Fast Initial Link Setup function, the service processing module and the access point set up initial link in a traditional initial link setup manner; and/or when the service processing module supports while the access point does not support the Fast Initial Link Setup function, the service processing module and the access point set up initial link in the traditional initial link setup manner; and/or when the service processing module does not support while the access point supports the Fast Initial Link Setup function, the service processing module and the access point set up initial link in the traditional initial link setup manner. In this technical solution, it can be ensured that the AP selects a proper manner to set up the initial link with the STA in combination with its supporting situation to the FILS function upon learning whether the STA supports the FILS function, and the traditional manner herein is equivalent to the steps in FIG. 1.

The present invention further provides a Fast Initial Link Setup communication method, comprising: generating an initial link setup first message which physical frame header comprises a first identification information field, and/or a physical layer convergence procedure service data unit comprises a second identification information field, and the value of the first identification information field is a first value and/or the value of the second identification information field is a second value, which indicates that a terminal supports a Fast Initial Link Setup function; sending the initial link setup first message; and/or receiving a Beacon frame, and the value of the first identification information field in the physical frame header of the Beacon frame is the first value and/or the value of the second identification information field in the physical layer convergence procedure service data unit is the second value, which indicates that an access point supports the Fast Initial Link Setup function. In this technical solution, the STA can use the initial link setup first message to inform in advance whether the AP supports the FILS function and can also judge whether the AP supports the FILS function according to the Beacon frame of the AP, which makes it convenient to set up mutual initial link between the AP and the STA in a proper manner.

In the above technical solution, preferably, the PSDU (PLCP service data unit) comprises an MPDU (MAC protocol data unit) which is an MAC frame which comprises a media access control frame header and a media access control frame body. In this technical solution, as long as the initial link setup first message comprises the PSDU, the frame body portion of the MPDU in the PSDU can be used to identify the FILS function.

In the above technical solution, preferably, the first identification information field comprises one or more bits of the signal domains of the Beacon frame and/or the physical frame header of the initial link setup first message; and the second identification information field comprises one or more bits of the Beacon frame and/or the media access control frame of the initial link setup first message. In this technical solution, by way of using the SIG domains in the physical frame header in the initial link setup first message or the Beacon frame and the MAC frame in the PSDU, informing and discovering the FILS function can be achieved quickly for the STA and the AP.

In the above technical solution, preferably, the second identification information field comprises one or more bits in the ability information domain of the Beacon frame and/or the media access control frame body of the initial link setup first message. In this technical solution, the ability information domain that can be provided with the identification information field is specifically shown, and one skilled in the art should understand that other bits can be selected as the identification information field based on the format changes of the Beacon frame or the initial link setup first message.

In the above technical solution, preferably, the initial link setup first message comprises a probe request frame and/or an association request frame. In this technical solution, the probe request frame and the association request frame also having the PSDU form structure, or the combination of the two are clearly shown, and one skilled in the art should understand that more messages with similar structures can serve as the initial link setup first message.

In the above technical solution, preferably, the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the terminal and/or the access point support a traditional initial link setup function. In this technical solution, the identification information field can be used to clearly indicate whether the AP and the STA support the initial link setup function of the traditional manner, and the traditional manner herein is equivalent to the steps in FIG. 1.

In the above technical solution, preferably, it further comprises: when the terminal and the access point both support the Fast Initial Link Setup function, the terminal and the access point set up initial link in a prescribed manner of the Fast Initial Link Setup; and/or when the terminal and the access point do not support the Fast Initial Link Setup function, the terminal and the access point set up initial link in a traditional initial link setup manner; and/or when the terminal supports while the access point does not support the Fast Initial Link Setup function, the terminal and the access point set up initial link in the traditional initial link setup manner; and/or when the terminal does not support while the access point supports the Fast Initial Link Setup function, the terminal and the access point set up initial link in the traditional initial link setup manner. In this technical solution, it can be ensured that the AP selects a proper manner to set up the initial link with the STA in combination with its supporting situation to the FILS function upon learning whether the STA supports the FILS function, and the traditional manner herein is equivalent to the steps in FIG. 1.

The above technical solutions can achieve the Fast Initial Link Setup communication method and the Fast Initial Link Setup communication device, and solve the incompatibility problem of being unable to set up mutual initial link when an STA that does not support the FILS function enters a WLAN network which supports the FILS function and an STA that supports the FILS function enters a WLAN that does not support the FILS function.

DETAILED DESCRIPTION OF THE PRESENT INVENTION

To more clearly understand the above objects, features and advantages of the present invention, the present invention will be further detailed hereinafter in combination with the accompanying drawings and embodiments. It needs to be indicated that the embodiments of the present invention and the features in the embodiments can be combined with each other in the case of no conflict.

Figure 2:
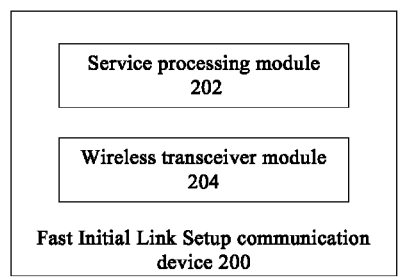
FIG. 2 is a block diagram of the Fast Initial Link Setup communication device according to an embodiment of the present invention.

Many details are described hereinafter for fully understanding the present invention, however, the present invention can also be implemented by embodiments other than those described herein, thus, the present invention is not restricted to or limited by the following specific embodiments.

FIG. 2 is a block diagram of the Fast Initial Link Setup communication device according to an embodiment of the present invention.

As shown in FIG. 2, the present invention provides a Fast Initial Link Setup communication device 200, comprising: a service processing module 202 which generates a Beacon frame which physical frame header comprises a first identification information field, and/or a physical layer convergence procedure service data unit comprises a second identification information field, and the value of the first identification information field is a first value and/or the value of the second identification information field is a second value, which indicates that the service processing module 202 supports a Fast Initial Link Setup function, and sends the Beacon frame through a wireless transceiver module 204; and/or receives an initial link setup first message through the wireless transceiver module 204, and the value of the first identification information field in the physical frame header of the initial link setup first message is the first value and/or the value of the second identification information field in the physical layer convergence procedure service data unit is the second value, which indicates that a terminal supports the Fast Initial Link Setup function; and the wireless transceiver module 204 which interacts data frame with the said Fast Initial Link Setup communication devices 200 which support the said Fast Initial Link Setup. In this technical solution, the Fast Initial Link Setup communication device 200 can be devices such as a router, a mobile phone, a tablet computer, and a notebook computer, and can serve as an AP, the service processing module 202 is equivalent to a chip processing the services of the wireless local area network, the wireless transceiver module 204 is equivalent to an antenna which transceives the signals of the WLAN, and the AP can use the Beacon frame to inform in advance whether the STA supports the FILS function and can also judge whether the STA supports the FILS function according to the initial link setup first message of the STA, which makes it convenient to set up mutual initial link between the AP and the STA in a proper manner.

In the above technical solution, the PSDU (PSDU PLCP service data unit) comprises an MPDU (MAC protocol data unit) which is an MAC frame which comprises a media access control frame header and a media access control frame body. In this technical solution, as long as the initial link setup first message comprises the PSDU, the frame body portion of the MPDU in the PSDU can be used to identify the FILS function.

In the above technical solution, the first identification information field comprises one or more bits of the signal domains of the Beacon frame and/or the physical frame header of the initial link setup first message; and the second identification information field comprises one or more bits of the Beacon frame and/or the media access control frame of the initial link setup first message. In this technical solution, by way of using the SIG (signal) domains in the Beacon frame or the physical frame header in the initial link setup first message and the MAC frame in the PSDU, informing and discovering the FILS function can be achieved quickly for the STA and the AP.

In the above technical solution, the second identification information field comprises one or more bits in the ability information domain of the Beacon frame and/or the media access control frame body of the initial link setup first message. In this technical solution, the ability information domain that can be provided with the identification information field is specifically shown, and one skilled in the art should understand that other bits can be selected as the identification information field based on the format changes of the Beacon frame or the initial link setup first message.

In the above technical solution, the initial link setup first message comprises a probe request frame and/or an association request frame. In this technical solution, the probe request frame and the association request frame also having the PSDU form structure, or the combination of the two are clearly shown, and one skilled in the art should understand that more messages with similar structures can serve as the initial link setup first message.

In the above technical solution, preferably, the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the service processing module 202 and/or the terminal support a traditional initial link setup function. In this technical solution, the identification information field can be used to clearly indicate whether the AP and the STA support the initial link setup function of the traditional manner, and the traditional manner herein is equivalent to the steps in FIG. 1.

In the above technical solution, when the service processing module 202 and the terminal both support the Fast Initial Link Setup function, the service processing module 202 and the terminal set up initial link in a prescribed manner of the Fast Initial Link Setup; and/or when the service processing module 202 and the terminal do not support the Fast Initial Link Setup function, the service processing module 202 and the terminal set up initial link in a traditional initial link setup manner; and/or when the service processing module 202 supports while the terminal does not support the Fast Initial Link Setup function, the service processing module 202 and the terminal set up initial link in the traditional initial link setup manner; and/or when the service processing module 202 does not support while the terminal supports the Fast Initial Link Setup function, the service processing module 202 and the terminal set up initial link in the traditional initial link setup manner. In this technical solution, it can be ensured that the AP selects a proper manner to set up the initial link with the STA in combination with its supporting situation to the FILS function upon learning whether the STA supports the FILS function, and the traditional manner herein is equivalent to the steps in FIG. 1.

Figure 3A:
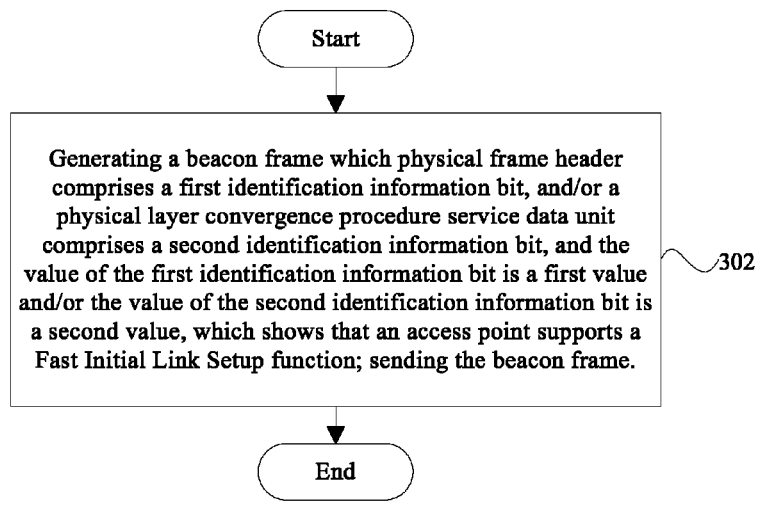
FIGS. 3A-3C are flow charts of the Fast Initial Link Setup communication method according to an embodiment of the present invention.
Figure 3B:
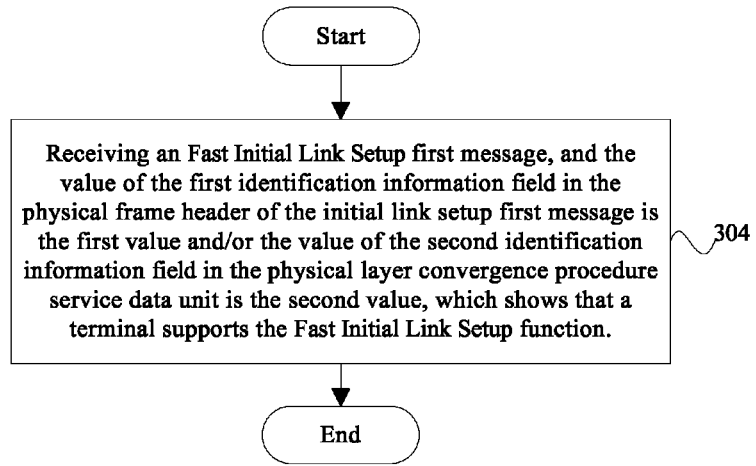
Figure 3C:
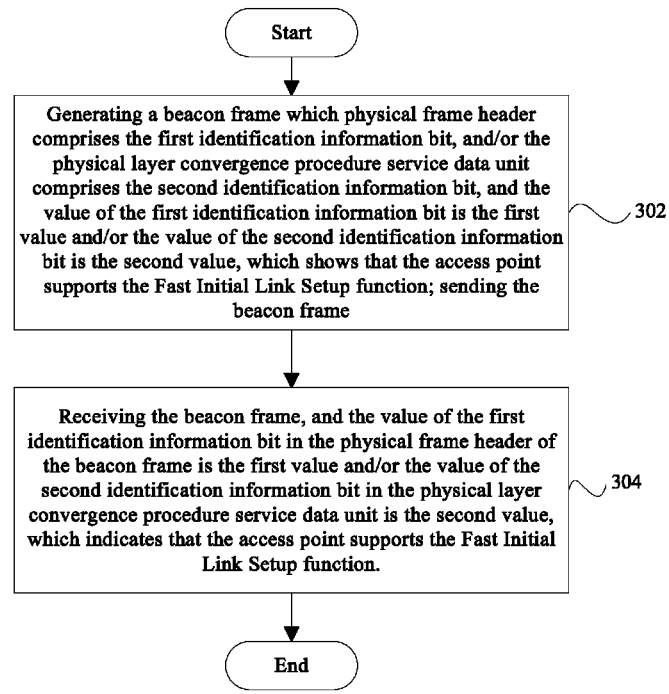

FIGS. 3A-3C show the Fast Initial Link Setup communication method according to an embodiment of the present invention.

As shown in FIG. 3A, the present invention also provides a Fast Initial Link Setup communication method, comprising: step 302, generating a Beacon frame which physical frame header comprises a first identification information field, and/or a physical layer convergence procedure service data unit comprises a second identification information field, and the value of the first identification information field is a first value and/or the value of the second identification information field is a second value, which indicates that an access point supports a Fast Initial Link Setup function; sending the Beacon frame. As shown in FIG. 3B, the present invention also provides a Fast Initial Link Setup communication method, comprising: step 304, receiving an initial link setup first message, and the value of the first identification information field in the physical frame header of the initial link setup first message is the first value and/or the value of the second identification information field in the physical layer convergence procedure service data unit is the second value, which indicates that a terminal supports the Fast Initial Link Setup function. As shown in FIG. 3C, the present invention also provides a Fast Initial Link Setup communication method, comprising: step 302, generating a Beacon frame which physical frame header comprises the first identification information field, and/or the physical layer convergence procedure service data unit comprises the second identification information field, and the value of the first identification information field is the first value and/or the value of the second identification information field is the second value, which indicates that the access point supports the Fast Initial Link Setup function; sending the Beacon frame; and step 304, receiving the initial link setup first message, and the value of the first identification information field in the physical frame header of the initial link setup first message is the first value and/or the value of the second identification information field in the physical layer convergence procedure service data unit is the second value, which indicates that the terminal supports the Fast Initial Link Setup function. In this technical solution, the AP can use the Beacon frame to inform in advance whether the STA supports the FILS function and can also judge whether the STA supports the FILS function according to the initial link setup first message of the STA, which makes it convenient to set up mutual initial link between the AP and the STA in a proper manner.

In the above technical solution, the PSDU (PSDU PLCP service data unit) comprises an MPDU (MAC protocol data unit) which is an MAC frame which comprises a media access control frame header and a media access control frame body. In this technical solution, as long as the initial link setup first message comprises the PSDU, the frame body portion of the MPDU in the PSDU can be used to identify the FILS function.

In the above technical solution, the first identification information field comprises one or more bits of the signal domains of the Beacon frame and/or the physical frame header of the initial link setup first message; and the second identification information field comprises one or more bits of the Beacon frame and/or the media access control frame of the initial link setup first message. In this technical solution, by way of using the SIG (signal) domains in the Beacon frame or the physical frame header in the initial link setup first message and the MAC frame in the PSDU, informing and discovering the FILS function can be achieved quickly for the STA and the AP.

In the above technical solution, the second identification information field comprises one or more bits in the ability information domain of the Beacon frame and/or the media access control frame body of the initial link setup first message. In this technical solution, the ability information domain that can be provided with the identification information field is specifically shown, and one skilled in the art should understand that other bits can be selected as the identification information field based on the format changes of the Beacon frame or the initial link setup first message.

In the above technical solution, the initial link setup first message comprises a probe request frame and/or an association request frame. In this technical solution, the probe request frame and the association request frame also having the PSDU form structure, or the combination of the two are clearly shown, and one skilled in the art should understand that more messages with similar structures can serve as the initial link setup first message.

In the above technical solution, the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the access point and/or the terminal support a traditional initial link setup function. In this technical solution, the identification information field can be used to clearly indicate whether the AP and the STA support the initial link setup function of the traditional manner, and the traditional manner herein is equivalent to the steps in FIG. 1.

In the above technical solution, it further comprises: when the access point and the terminal both support the Fast Initial Link Setup function, the access point and the terminal set up initial link in a prescribed manner of the Fast Initial Link Setup; and/or when the access point and the terminal do not support the Fast Initial Link Setup function, the access point and the terminal set up initial link in the traditional initial link setup manner; and/or when the access point supports while the terminal does not support the Fast Initial Link Setup function, the access point and the terminal set up initial link in the traditional initial link setup manner; and/or when the access point does not support while the terminal supports the Fast Initial Link Setup function, the access point and the terminal set up initial link in the traditional initial link setup manner. In this technical solution, it can be ensured that the AP selects a proper manner to set up the initial link with the STA in combination with its supporting situation to the FILS function upon learning whether the STA supports the FILS function, and the traditional manner herein is equivalent to the steps in FIG. 1.

Figure 4:
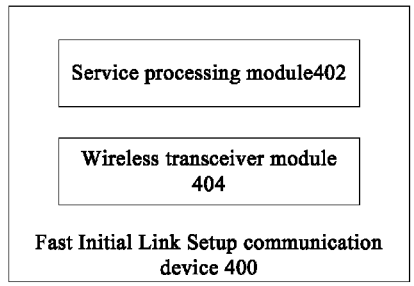
FIG. 4 is a block diagram of the Fast Initial Link Setup communication device according to an embodiment of the present invention.

FIG. 4 is a block diagram of the Fast Initial Link Setup communication device according to an embodiment of the present invention.

As shown in FIG. 4, the present invention further provides a Fast Initial Link Setup communication device 400, comprising: a service processing module 402 which generates an initial link setup first message which physical frame header comprises a first identification information field, and/or a physical layer convergence procedure service data unit comprises a second identification information field, and the value of the first identification information field is a first value and/or the value of the second identification information field is a second value, which indicates that the service processing module 402 supports a Fast Initial Link Setup function, and sends the initial link setup first message through a wireless transceiver module 404; and/or receives a Beacon frame through the wireless transceiver module 404, and the value of the first identification information field in the physical frame header of the Beacon frame is the first value and/or the value of the second identification information field in the physical layer convergence procedure service data unit is the second value, which indicates that an access point supports the Fast Initial Link Setup function; and the wireless transceiver module 404 which interacts data frame with the said Fast Initial Link Setup communication devices 400 which support the said Fast Initial Link Setup. In this technical solution, the Fast Initial Link Setup communication device 400 can be devices such as a mobile phone, a tablet computer, and a notebook computer, and can serve as an STA, the service processing module 402 is equivalent to a chip processing the services of the wireless local area network, the wireless transceiver module 404 is equivalent to an antenna which transceives the signals of the WLAN, and the STA can use the initial link setup first message to inform in advance whether the AP supports the FILS function and can also judge whether the AP supports the FILS function according to the Beacon frame of the AP, which makes it convenient to set up mutual initial link between the AP and the STA in a proper manner.

In the above technical solution, the PSDU (PLCP service data unit) comprises an MPDU (MAC protocol data unit) which is an MAC (Media Access Control) frame which comprises a media access control frame header and a media access control frame body. In this technical solution, as long as the initial link setup first message comprises the PSDU, the frame body portion of the MPDU in the PSDU can be used to identify the FILS function.

In the above technical solution, the first identification information field comprises one or more bits of the signal domains of the Beacon frame and/or the physical frame header of the initial link setup first message; and the second identification information field comprises one or more bits of the Beacon frame and/or the media access control frame of the initial link setup first message. In this technical solution, by way of using the SIG domains in the physical frame header in the initial link setup first message or the Beacon frame and the MAC frame in the PSDU, informing and discovering the FILS function can be achieved quickly for the STA and the AP.

In the above technical solution, the second identification information field comprises one or more bits in the ability information domain of the Beacon frame and/or the media access control frame body of the initial link setup first message. In this technical solution, the ability information domain that can be provided with the identification information field is specifically shown, and one skilled in the art should understand that other bits can be selected as the identification information field based on the format changes of the Beacon frame or the initial link setup first message.

In the above technical solution, the initial link setup first message comprises a probe request frame and/or an association request frame. In this technical solution, the probe request frame and the association request frame also having the PSDU form structure, or the combination of the two are clearly shown, and one skilled in the art should understand that more messages with similar structures can serve as the initial link setup first message.

In the above technical solution, the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the service processing module 402 and/or the access point support a traditional initial link setup function. In this technical solution, the identification information field can be used to clearly indicate whether the AP and the STA support the initial link setup function of the traditional manner, and the traditional manner herein is equivalent to the steps in FIG. 1.

In the above technical solution, when the service processing module 402 and the access point both support the Fast Initial Link Setup function, the service processing module 402 and the access point set up initial link in a prescribed manner of the Fast Initial Link Setup; and/or when the service processing module 402 and the access point do not support the Fast Initial Link Setup function, the service processing module 402 and the access point set up initial link in the traditional initial link setup manner; and/or when the service processing module 402 supports while the access point does not support the Fast Initial Link Setup function, the service processing module 402 and the access point set up initial link in the traditional initial link setup manner; and/or when the service processing module 402 does not support while the access point supports the Fast Initial Link Setup function, the service processing module 402 and the access point set up initial link in the traditional initial link setup manner. In this technical solution, it can be ensured that the AP selects a proper manner to set up the initial link with the STA in combination with its supporting situation to the FILS function upon learning whether the STA supports the FILS function, and the traditional manner herein is equivalent to the steps in FIG. 1.

Figure 5A:
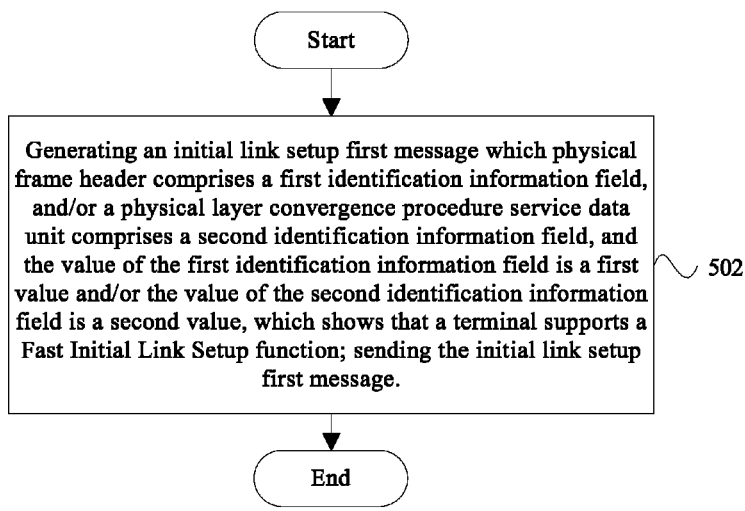
FIGS. 5A-5C are flow charts of the Fast Initial Link Setup communication method according to an embodiment of the present invention.
Figure 5B:
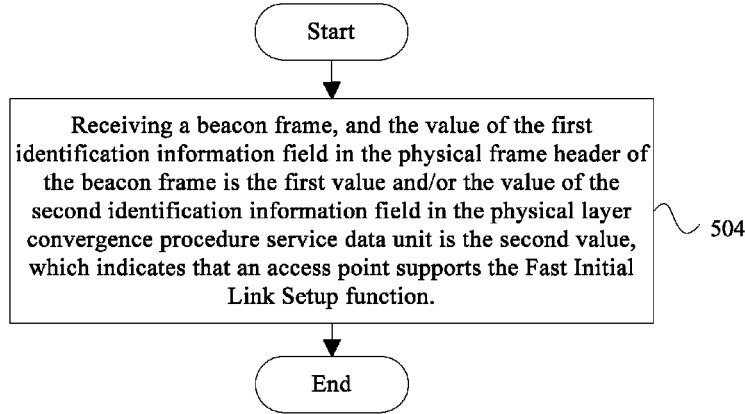
Figure 5C:
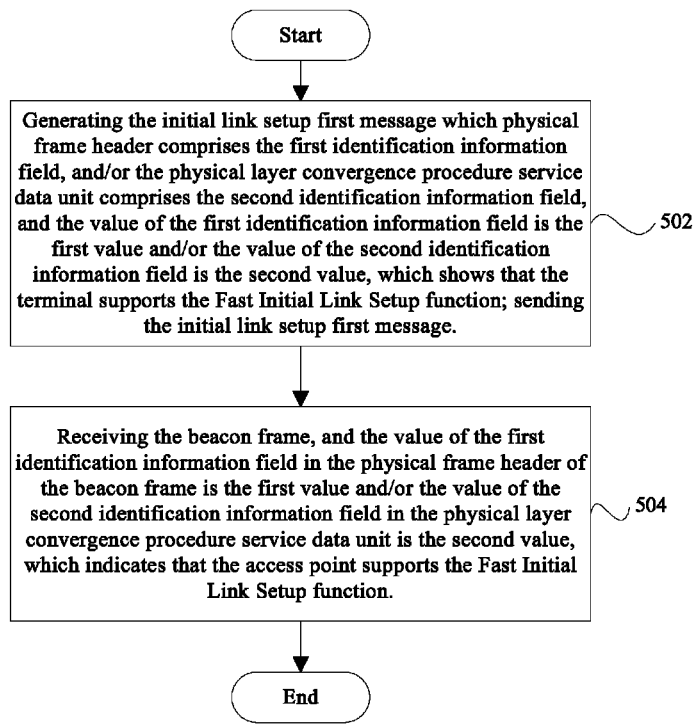

FIGS. 5A-5C are flow charts of the Fast Initial Link Setup communication method according to an embodiment of the present invention.

As shown in FIG. 5A, the present invention also provides a Fast Initial Link Setup communication method, comprising: step 502, generating an initial link setup first message which physical frame header comprises a first identification information field, and/or a physical layer convergence procedure service data unit comprises a second identification information field, and the value of the first identification information field is a first value and/or the value of the second identification information field is a second value, which indicates that a terminal supports a Fast Initial Link Setup function; sending the initial link setup first message. As shown in FIG. 5B, the present invention also provides a Fast Initial Link Setup communication method, further comprising: step 504, receiving a Beacon frame, and the value of the first identification information field in the physical frame header of the Beacon frame is the first value and/or the value of the second identification information field in the physical layer convergence procedure service data unit is the second value, which indicates that an access point supports the Fast Initial Link Setup function. As shown in FIG. 5C, the present invention also provides a Fast Initial Link Setup communication method, comprising: step 502, generating the initial link setup first message which physical frame header comprises the first identification information field, and/or the physical layer convergence procedure service data unit comprises the second identification information field, and the value of the first identification information field is the first value and/or the value of the second identification information field is the second value, which indicates that the terminal supports the Fast Initial Link Setup function; sending the initial link setup first message; and step 504, receiving the Beacon frame, and the value of the first identification information field in the physical frame header of the Beacon frame is the first value and/or the value of the second identification information field in the physical layer convergence procedure service data unit is the second value, which indicates that the access point supports the Fast Initial Link Setup function. In this technical solution, the STA can use the initial link setup first message to inform in advance whether the AP supports the FILS function and can also judge whether the AP supports the FILS function according to the Beacon frame of the AP, which makes it convenient to set up mutual initial link between the AP and the STA in a proper manner.

In the above technical solution, the PSDU (PLCP service data unit) comprises an MPDU (MAC protocol data unit)

which is an MAC frame which comprises a media access control frame header and a media access control frame body. In this technical solution, as long as the initial link setup first message comprises the PSDU, the frame body portion of the MPDU in the PSDU can be used to identify the FILS function.

In the above technical solution, the first identification information field comprises one or more bits of the signal domains of the Beacon frame and/or the physical frame header of the initial link setup first message; and the second identification information field comprises one or more bits of the Beacon frame and/or the media access control frame of the initial link setup first message. In this technical solution, by way of using the SIG domains in the physical frame header in the initial link setup first message or the Beacon frame and the MAC frame in the PSDU, informing and discovering the FILS function can be achieved quickly for the STA and the AP.

In the above technical solution, the second identification information field comprises one or more bits in the ability information domain of the Beacon frame and/or the the media access control frame body of the initial link setup first message. In this technical solution, the ability information domain that can be provided with the identification information field is specifically shown, and one skilled in the art should understand that other bits can be selected as the identification information field based on the format changes of the Beacon frame or the initial link setup first message.

In the above technical solution, the initial link setup first message comprises a probe request frame and/or an association request frame. In this technical solution, the probe request frame and the association request frame also having the PSDU form structure, or the combination of the two are clearly shown, and one skilled in the art should understand that more messages with similar structures can serve as the initial link setup first message.

In the above technical solution, the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the terminal and/or the access point support the traditional initial link setup function. In this technical solution, the identification information field can be used to clearly indicate whether the AP and the STA support the initial link setup function of the traditional manner, and the traditional manner herein is equivalent to the steps in FIG. 1.

In the above technical solution, it further comprises: when the terminal and the access point both support the Fast Initial Link Setup function, the terminal and the access point set up initial link in a prescribed manner of the Fast Initial Link Setup; and/or when the terminal and the access point do not support the Fast Initial Link Setup function, the terminal and the access point set up initial link in the traditional initial link setup manner; and/or when the terminal supports while the access point does not support the Fast Initial Link Setup function, the terminal and the access point set up initial link in the traditional initial link setup manner; and/or when the terminal does not support while the access point supports the Fast Initial Link Setup function, the terminal and the access point set up initial link in the traditional initial link setup manner. In this technical solution, it can be ensured that the AP selects a proper manner to set up the initial link with the STA in combination with its supporting situation to the FILS function upon learning whether the STA supports the FILS function, and the traditional manner herein is equivalent to the steps in FIG. 1.

The technical solutions of the present invention will be detailed hereinafter through an embodiment of the present invention.

In an embodiment of the present invention, manners indicating whether the AP or STA supports the FILS function is provided, and one is to use the physical frame header of the Beacon frame or the MAC frame to indicate whether the AP supports the FILS function, and the other is to use the physical frame header of the initial link setup first message and the MAC frame having a PPDU (PLCP Data Unit) format such as a probe request or an association request to indicate whether the STA supports the FILS function, which are detailed as follow.

1. As Indicated in the MAC Frame:

The STA can set up initial link with the AP through two manners, i.e., passive scanning and initiative scanning. The passive scanning refers to that the STA monitors the Beacon frame periodically broadcast by the AP, and the initiative scanning refers to that the STA sends request messages such as the probe request or the association request to the AP, and usually the STA uses the first manner to set up the initial link.

Regardless of the Beacon frame broadcast by the AP or the initial link setup first message sent by the STA, including the probe request frame and the association request frame, finally they are sent out in the form of the PPDU (PLCP protocol data unit), and the PPDU format comprises a physical frame header portion and a data portion, wherein, the data portion is the PSDU (PLCP service data unit) comprising the MPDU (MAC protocol data unit), and the MPDU is the MAC frame which is divided into an MAC frame header and an MAC frame body.

Figure 6:
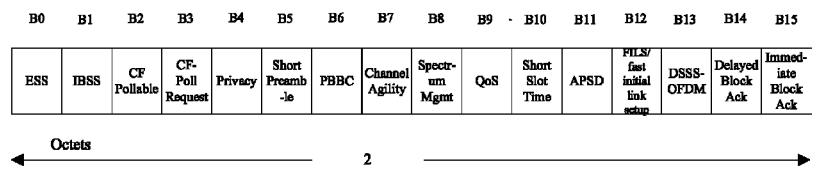
FIG. 6 is a schematic diagram of a portion of the Beacon frame according to an embodiment of the present invention.

The ability information domain exists in the Beacon frame and the MAC frame body of the PSDU and indicates the ability information elements of the AP, and specifically, referring to FIG. 6, the structure of the frame has a reserved bit B12, and the AP can use the B12 as an FILS function bit, wherein, 0 represents that the AP does not support the FILS function and 1 represents that the AP supports the FILS function.

In the initial link setup message, taking the probe request as an example, by way of designing the MAC frame body portion of the probe request also having the PPDU form structure, indicating the FILS function can also be achieved, and the following table indicates the frame body structure of the probe request, which includes an FILS capability for indicating whether the STA supports the FILS function. The MAC frame body portion of the association request can also be designed according to the following table.

| Order | Information | Notes |
| --- | --- | --- |
| 1 | SSID | |
| 2 | Supported rates | |
| 3 | Request information | May be included if dot11MultiDomainCapabilityEnabled is true. |
| 4 | Extended Supported Rates | The Extended Supported Rates element is present whenever there are more than eight supported rates, and it is optional otherwise. |
| 5 | FILS capability | Indicate STA to support FILS function |
| Last | Vendor Specific | One or more vendor-specific information elements may appear in this frame. This information element follows all other information elements. |

Figure 7:
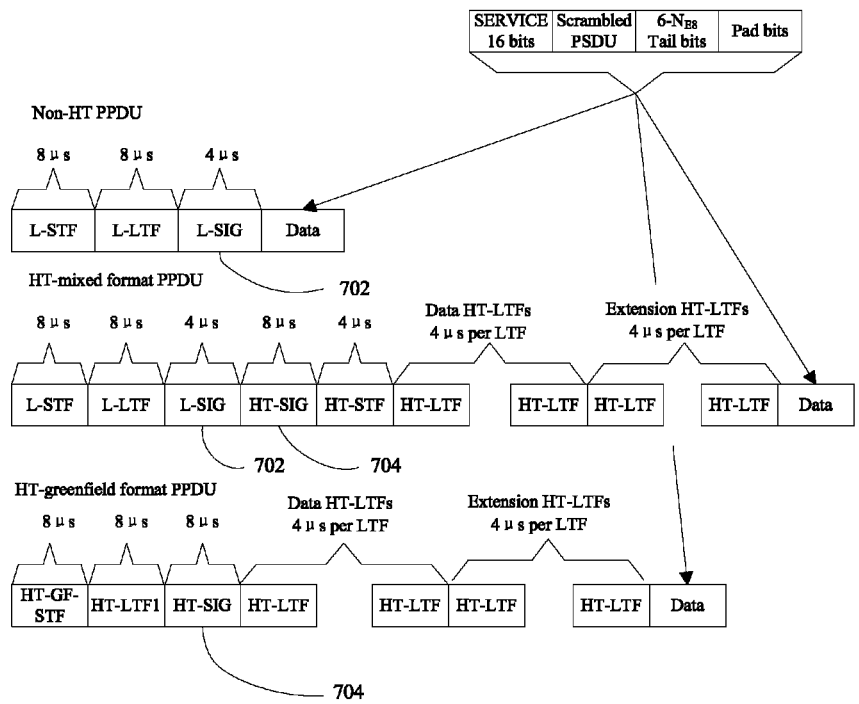
FIG. 7 is a schematic diagram of a portion of the Beacon frame or the initial link setup first message according to an embodiment of the present invention.

2. As Indicated in the Physical Frame Header:

Regardless of the Beacon frame broadcast by the AP or the initial link setup first message sent by the STA, including the probe request frame and the association request frame, finally they are sent out in the form of the PPDU, and their structures are shown in FIG. 7, and the data portion of the PPDU is the PSDU (PLCP service data unit), including the MAC frame, the physical frame header portion comprises the SIG (signal) domain, and in different forms of the PPDU, the domain can be made of different portions and can only include the L-SIG (legacy signal domain) 602 or the HT-SIG (high throughput signal domain) 604, or include both of them, wherein, L is the abbreviation of Legacy, and HT is the abbreviation of high throughput.

Figure 8:
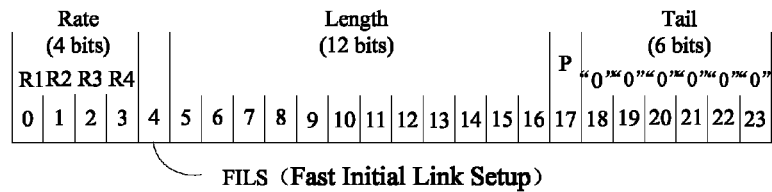
FIG. 8 is a schematic diagram of a portion of the Beacon frame or the initial link setup first message according to an embodiment of the present invention.

As shown in FIG. 8, the AP uses the reserved bit (i.e., the fourth bit) in the L-SIG domain in the Beacon frame as the FILS function bit, and if the bit is set to be 0, it indicates that the AP does not support the FILS function, if the bit is set to be 1, it indicates that the AP supports the FILS function.

Likewise, the STA uses the value of the reserved bit (i.e., the fourth bit) in the L-SIG domain in the physical frame header of the probe request or the association request as the FILS function bit, and if the bit is set to be 0, it indicates that the STA does not support the FILS function, if the bit is set to be 1, it indicates that the STA supports the FILS function.

Figure 9:
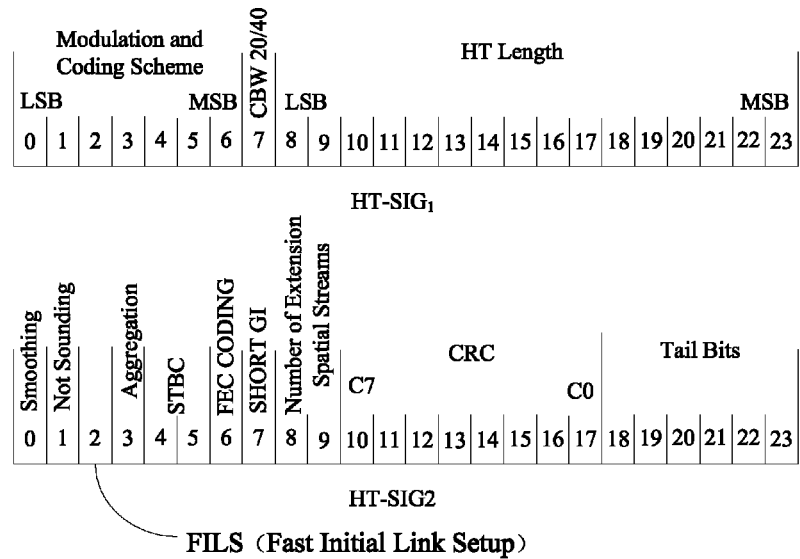
FIG. 9 is a schematic diagram of a portion of the Beacon frame or the initial link setup first message according to an embodiment of the present invention.

As shown in FIG. 9, the HT-SIG domain comprises two portions of HT-SIG1 and HT-SIG2, wherein, the HT-SIG1 portion does not have the reserved bit, thus the AP uses the reserved bit (i.e., the second bit) in the HT-SIG2 domain in the physical frame header of the Beacon frame as the FILS function bit, and if the bit is set to be 0, it indicates that the AP does not support the FILS function, if the bit is set to be 1, it indicates that the AP supports the FILS function.

Likewise, the STA uses the reserved bit (i.e., the second bit) in the HT-SIG2 domain in the physical frame header of the probe request or the association request as the FILS function bit, and if the bit is set to be 0, it indicates that the STA does not support the FILS function, if the bit is set to be 1, it indicates that the STA supports the FILS function.

Figure 10:
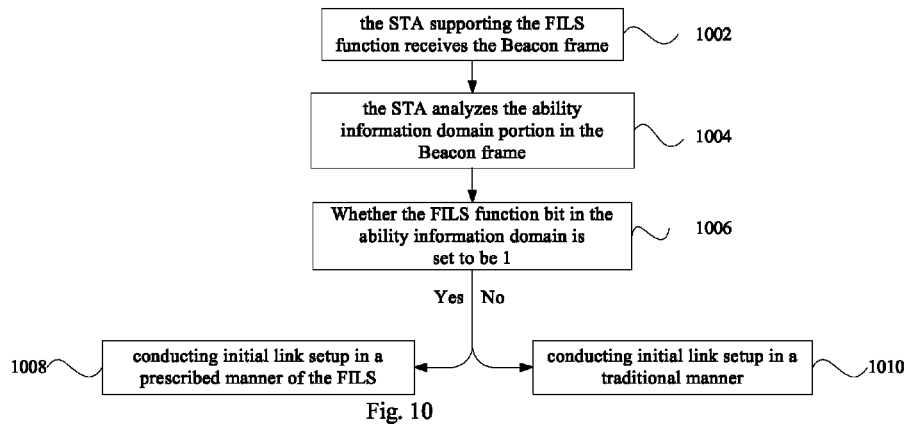
FIG. 10 is a working flow chart of the Fast Initial Link Setup communication device according to an embodiment of the present invention.

According to the above description, the flow that the STA sets up initial link with the AP through the passive scanning is shown in FIG. 10:

Step 1002, the STA supporting the FILS function receives the Beacon frame from the AP.

Step 1004, the STA analyzes the ability information domain portion in the MAC frame body in the Beacon frame and extracts the value of the FILS function bit therein.

Step 1006, whether the value of the FILS function bit in the ability information domain is 1 is judged.

Step 1008, if the value is 1, it can be determined that the AP supports the FILS function and sets up the initial link in a prescribed manner of the FILS.

Figure 1:
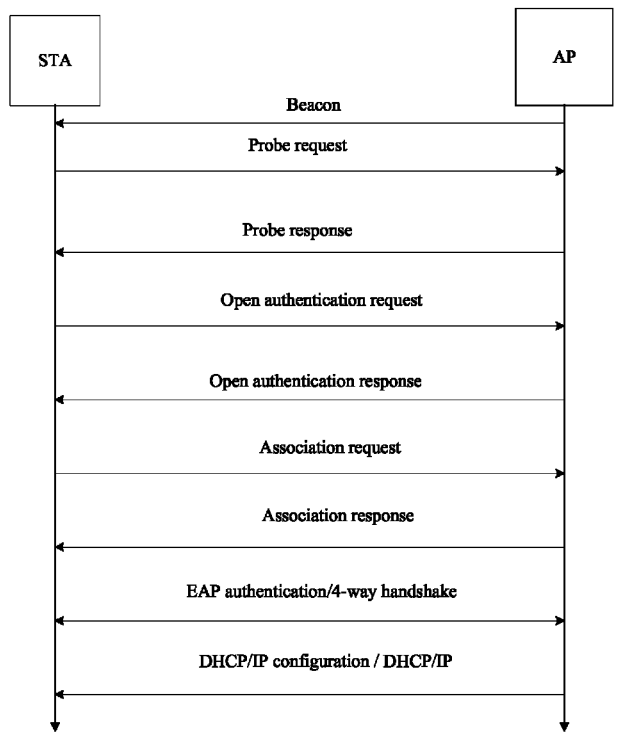
FIG. 1 is a schematic diagram of setting up initial link between a terminal and an access point in the traditional initial link setup manner in the prior art.

Step 1010, if the value is 0, it can be determined that the AP does not support the FILS function, initial link with the AP can be set up in a normal manner, i.e., the manner shown in FIG. 1.

Figure 11:
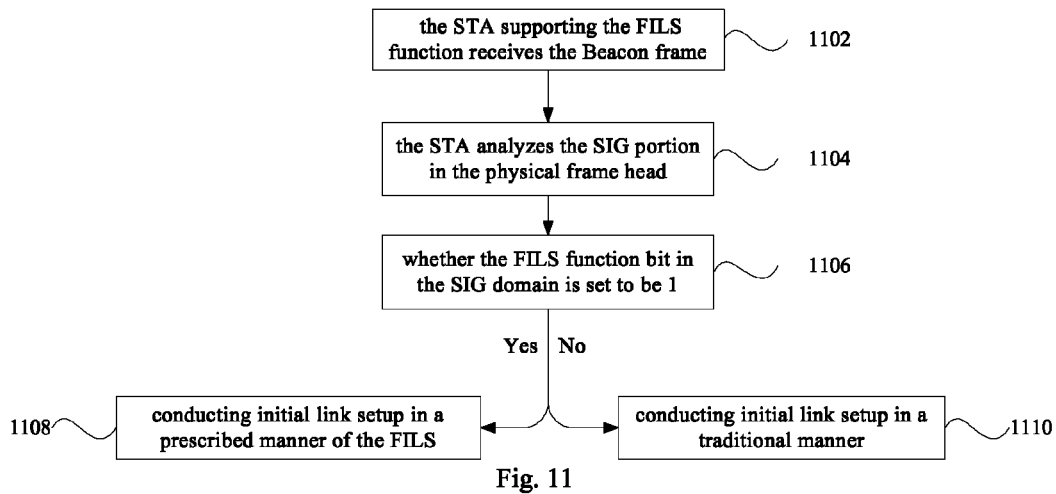
FIG. 11 is a working flow chart of the Fast Initial Link Setup communication device according to an embodiment of the present invention.

The working flow of the STA and the AP can also be as follow:

According to the above description, the flow that the STA sets up link with the AP can also be shown in FIG. 11:

Step 1102, the STA supporting the FILS function receives the Beacon frame from the AP.

Step 1104, the STA analyzes the SIG domain portion in the physical frame header in the Beacon frame and extracts the value of the FILS function bit therein.

Step 1106, whether the value of the FILS function bit in the SIG domain is 1 is judged.

Step 1108, if the value is 1, it can be determined that the AP supports the FILS function and sets up the initial link in a prescribed manner of the FILS.

Step 1110, if the value is 0, it can be determined that the AP does not support the FILS function, initial link with the AP can be set up in a normal manner, i.e., the manner shown in FIG. 1.

Figure 12:
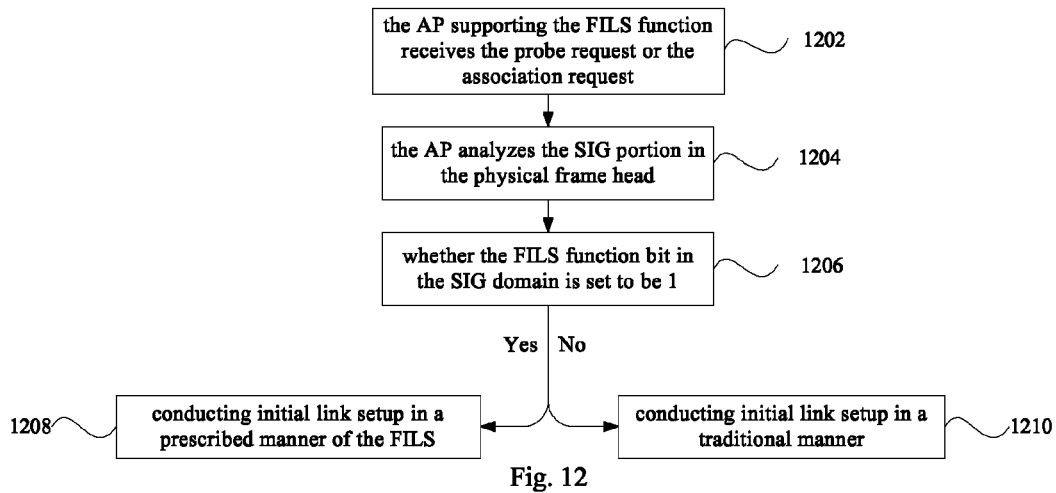
FIG. 12 is a working flow chart of the Fast Initial Link Setup communication device according to an embodiment of the present invention.

The flow that the STA sets up initial link with the AP through the initiative scanning is shown in FIG. 12:

Step 1202, the STA sends the probe request or the association request, and meanwhile, the AP supporting the FILS function receives the probe request or the association request.

Step 1204, the AP analyzes the SIG domain portion in the physical frame header in the probe request or association request frame and extracts the value of the FILS function bit therein.

Step 1206, whether the value of the FILS function bit is 1 is judged.

Step 1208, if the value is 1, it can be determined that the STA supports the FILS function and sets up the initial link in a prescribed manner of the FILS.

Step 1210, if the value is 0, it can be determined that the STA does not support the FILS function, initial link with the AP can be set up in a normal manner, i.e., the manner shown in FIG. 1.

Figure 13:
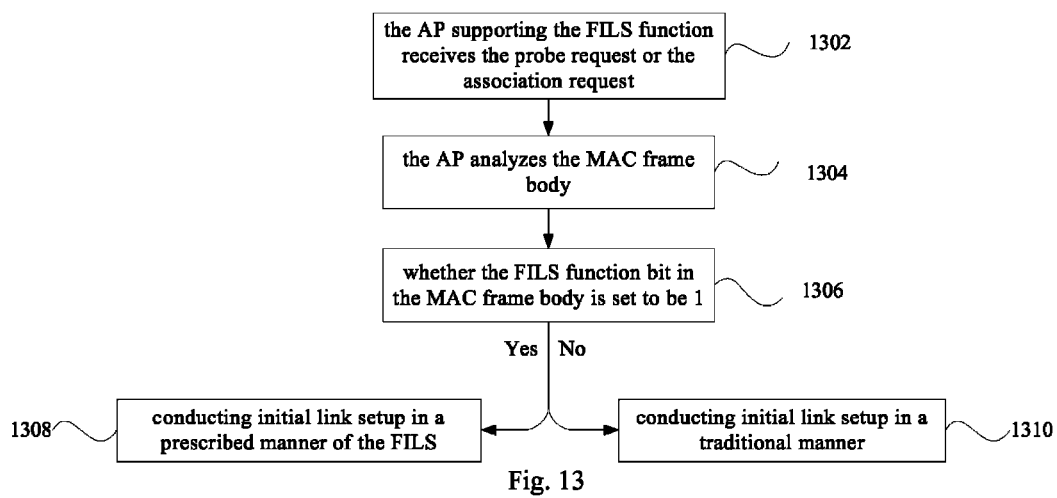
FIG. 13 is a working flow chart of the Fast Initial Link Setup communication device according to an embodiment of the present invention.

Another flow that the STA sets up initial link with the AP through the initiative scanning is shown in FIG. 13:

Step 1302, the STA sends the probe request or the association request, and meanwhile, the AP supporting the FILS function receives the probe request or the association request.

Step 1304, the AP analyzes the MAC frame body portion in the probe request or association request frame and extracts the value of the FILS function bit therein.

Step 1306, whether the value of the FILS function bit is 1 is judged.

Step 1308, if the value is 1, it can be determined that the STA supports the FILS function and sets up the initial link in a prescribed manner of the FILS.

Step 1310, if the value is 0, it can be determined that the STA does not support the FILS function, initial link with the AP can be set up in a normal manner, i.e., the manner shown in FIG. 1.

The technical solutions of the present invention can achieve the Fast Initial Link Setup communication device and the Fast Initial Link Setup communication method, and can act in advance and decide using the FILS manner or a non-FILS manner to quicken the initial link setup of the STA according to the indication which indicates whether the STA or AP supports the FILS function or not, the indication is in the physical frame header or the MAC frame body portion; meanwhile, the compatibility problem of an STA supporting/not supporting the FILS function and an AP supporting/not supporting the FILS function is solved.

Described above are merely preferred embodiments of the present invention and are not intended to limit the present invention. For one skilled in the art, the present invention may have various alterations and changes. Any alterations, equivalent substitutions, improvements and etc. made within the spirit and principle of the present invention, should be covered in the scope of protection of the present invention.

The invention claimed is:

1. A Fast Initial Link Setup communication device, the device comprising:
    a service processing module which generates a Beacon frame having a physical frame header comprising a first identification information field, and a physical layer convergence procedure service data unit comprising a second identification information field, and the value of the first identification information field is a first value and/or the value of the second identification information field is a second value, which indicates that the service processing module supports a Fast Initial Link Setup function, and sends the Beacon frame through a wireless transceiver module; and/or receives an initial link setup first message through the wireless transceiver module, and the value of the first identification information field in the physical frame header of the initial link setup first message is the first value and/or the value of the second identification information field in the physical layer convergence procedure service data unit is the second value, which indicates that a terminal supports the Fast Initial Link Setup function; and the wireless transceiver module interacts a data frame with the outside of said Fast Initial Link Setup communication device, wherein the first identification information field comprises one or more bits of the signal domains of the Beacon frame, and the second identification information field comprises one or more bits of the Beacon frame and/or a media access control frame of the initial link setup first message.

2. The Fast Initial Link Setup communication device according to claim 1, wherein, the physical layer convergence procedure service data unit comprises a media access control protocol data unit which is a media access control frame which comprises a media access control frame header and a media access control frame body.

3. The Fast Initial Link Setup communication device according to claim 1, wherein, the second identification information field comprises one or more bits in the ability information domain of the Beacon frame and/or the media access control frame body of the initial link setup first message.

4. The Fast Initial Link Setup communication device according to claim 1, wherein the initial link setup first message comprises a probe request frame and/or an association request frame.

5. The Fast Initial Link Setup communication device according to claim 1, wherein the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the service processing module and/or the terminal support a traditional initial link setup function.

6. The Fast Initial Link Setup communication device according to claim 1, wherein when the service processing module and the terminal both support the Fast Initial Link Setup function, the service processing module and the terminal set up initial link in a prescribed manner of the Fast Initial Link Setup; and/or when the service processing module and the terminal do not support the Fast Initial Link Setup function, the service processing module and the terminal set up initial link in a traditional initial link setup manner; and/or when the service processing module supports while the terminal does not support the Fast Initial Link Setup function, the service processing module and the terminal set up initial link in the traditional initial link setup manner; and/or when the service processing module does not support while the terminal supports the Fast Initial Link Setup function, the service processing module and the terminal set up initial link in the traditional initial link setup manner.

7. A Fast Initial Link Setup communication method, comprising:

generating a Beacon frame having a physical frame header comprising a first identification information field, and a physical layer convergence procedure service data unit comprising a second identification information field, and the value of the first identification information field is a first value and/or the value of the second identification information field is a second value, which indicates that an access point supports a Fast Initial Link Setup function;

sending the Beacon frame; and/or receiving an initial link setup first message, and the value of the first identification information field in the physical frame header of the initial link setup first message is the first value and/or the value of the second identification information field in the physical layer convergence procedure service data unit is the second value, which indicates that a terminal supports the Fast Initial Link Setup function, wherein the first identification information field comprises one or more bits of the signal domains of the Beacon frame, and the second identification information field comprises one or more bits of the Beacon frame and/or a media access control frame of the initial link setup first message.

8. The Fast Initial Link Setup communication method according to claim 7, wherein, the physical layer convergence procedure service data unit comprises a media access control protocol data unit which is a media access control frame which comprises a media access control frame header and a media access control frame body.

9. The Fast Initial Link Setup communication method according to claim 7, wherein, the second identification information field comprises one or more bits in the ability information domain of the Beacon frame and/or the media access control frame body of the initial link setup first message.

10. The Fast Initial Link Setup communication method according to claim 7, wherein the initial link setup first message comprises a probe request frame and/or an association request frame.

11. The Fast Initial Link Setup communication method according to claim 7, wherein the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the access point and/or the terminal support a traditional initial link setup function.

12. The Fast Initial Link Setup communication method according to claim 7, further comprising:

when the access point and the terminal both support the Fast Initial Link Setup function, the access point and the terminal set up initial link in a prescribed manner of the Fast Initial Link Setup; and/or when the access point and the terminal do not support the Fast Initial Link Setup function, the access point and the terminal set up initial link in a traditional initial link setup manner; and/or when the access point supports while the terminal does not support the Fast Initial Link Setup function, the access point and the terminal set up initial link in the traditional initial link setup manner; and/or when the access point does not support while the terminal supports the Fast Initial Link Setup function, the access point and the terminal set up initial link in the traditional initial link setup manner.

13. A Fast Initial Link Setup communication device, comprising:

a service processing module which generates an initial link setup first message having a physical frame header comprising a first identification information field, and a physical layer convergence procedure service data unit comprising a second identification information field, and the value of the first identification information field is a first value and/or the value of the second identification information field is a second value, which indicates that the service processing module supports a Fast Initial Link Setup function, and sends the initial link setup first message through a wireless transceiver module; and/or receives a Beacon frame through the wireless transceiver module, and the value of the first identification information field in the physical frame header of the Beacon frame is the first value and/or the value of the second identification information field in the physical layer convergence procedure service data unit is the second value, which indicates that an access point supports the Fast Initial Link Setup function; and the wireless transceiver module interacts a data frame with the outside of said Fast Initial Link Setup communication device, wherein the first identification information field comprises one or more bits of the signal domains of the Beacon frame, and the second identification information field comprises one or more bits of the Beacon frame and/or a media access control frame of the initial link setup first message.

14. The Fast Initial Link Setup communication device according to claim 13, wherein, the physical layer convergence procedure service data unit comprises a media access control protocol data unit which is a media access control frame which comprises a media access control frame header and a media access control frame body.

15. The Fast Initial Link Setup communication device according to claim 13, wherein, the second identification information field comprises one or more bits in the ability information domain of the Beacon frame and/or the media access control frame body of the initial link setup first message.

16. The Fast Initial Link Setup communication device according to claim 13, wherein, the initial link setup first message comprises a probe request frame and/or an association request frame.

17. The Fast Initial Link Setup communication device according to claim 13, wherein, the Beacon frame and/or the physical frame header of the initial link setup first message comprise the first identification information field and/or the physical layer convergence procedure service data unit comprises the second identification information field, and the value of the first identification information field is the second value and/or the value of the second identification information field is the first value, which indicates that the service processing module and/or the access point support a traditional initial link setup function.

18. The Fast Initial Link Setup communication device according to claim 13, wherein, when the service processing module and the access point both support the Fast Initial Link Setup function, the service processing module and the access point set up initial link in a prescribed manner of the Fast Initial Link Setup; and/or when the service processing module and the access point do not support the Fast Initial Link Setup function, the service processing module and the access point set up initial link in a traditional initial link setup manner; and/or when the service processing module supports while the access point does not support the Fast Initial Link Setup function, the service processing module and the access point set up initial link in the traditional initial link setup manner; and/or when the service processing module does not support while the access point supports the Fast Initial Link Setup function, the service processing module and the access point set up initial link in the traditional initial link setup manner.

19. A Fast Initial Link Setup communication method, comprising:

generating an initial link setup first message having physical frame header comprising a first identification information field, and a physical layer convergence procedure service data unit comprising a second identification information field, and the value of the first identification information field is a first value and/or the value of the second identification information field is a second value, which indicates that a terminal supports a Fast Initial Link Setup function; sending the initial link setup first message; and/or receiving a Beacon frame, and the value of the first identification information field in the physical frame header of the Beacon frame is the first value and/or the value of the second identification information field in the physical layer convergence procedure service data unit is the second value, which indicates that an access point supports the Fast Initial Link Setup function, wherein the first identification information field comprises one or more bits of the signal domains of the Beacon frame, and the second identification information field comprises one or more bits of the Beacon frame and/or a media access control frame of the initial link setup first message.

20. The Fast Initial Link Setup communication method according to claim 19, wherein the physical layer convergence procedure service data unit comprises a media access control protocol data unit which is a media access control frame which comprises a media access control frame header and a media access control frame body.

21. The Fast Initial Link Setup communication method according to claim 19, wherein the second identification information field comprises one or more bits in the ability information domain of the Beacon frame and/or the media access control frame body of the initial link setup first message.

22. The Fast Initial Link Setup communication method according to claim 19, wherein the initial link setup first message comprises a probe request frame and/or an association request frame.

23. The Fast Initial Link Setup communication method according to claim 19, wherein the Beacon frame and/or the physical frame header of the initial link setup first message comprises the first identification information field and/or the physical layer convergence procedure service data unit comprises the second identification information field, and the value of the first identification information field is the second value and/or the value of the second identification information field is the first value, which indicates that the access point and/or the terminal support a traditional initial link setup function.

24. The Fast Initial Link Setup communication method according to claim 19, further comprising:
when the access point and the terminal both support the Fast Initial Link Setup function, the access point and the terminal set up initial link in a prescribed manner of the Fast Initial Link Setup; and/or when the access point and the terminal do not support the Fast Initial Link Setup function, the access point and the terminal set up initial link in a traditional initial link setup manner; and/or when the terminal supports while the access point does not support the Fast Initial Link Setup function, the access point and the terminal set up initial link in the traditional initial link setup manner; and/or when the terminal does not support while the access point supports the Fast Initial Link Setup function, the access point and the terminal set up initial link in the traditional initial link setup manner.

* * * * *